United States Patent Office 3,224,983
Patented Dec. 21, 1965

3,224,983
PROCESS OF FOAMING A CARBONATE CONTAINING POLYMER CONTAINING AN INITIATOR
Gaetano F. D'Alelio, South Bend, Ind., assignor to Scott Paper Company, Philadelphia, Pa., a corporation of Pennsylvania
No Drawing. Filed May 21, 1962, Ser. No. 196,431
4 Claims. (Cl. 260—2.5)

This invention is concerned with new foaming systems especially adapted to the production of cellulated or expanded polymers. Generally, it deals with a process of foaming thermoplastic, resinous polymers by means of organic compounds, which on heating in the presence of activators, liberate carbon dioxide. When this carbon dioxide is generated within the matrix of a polymer, expanded polymer compositions are obtained. A number of organic carbonates are known, such as ethylene carbonate, propylene carbonate, glyceryl carbonate, and the like, are known to liberate carbon dioxide upon heating. However, the temperature required to liberate the carbon dioxide from such compounds at a useful rate is very high, and if the decomposition is performed in the presence of resinous polymer, pyrolysis of the polymer occurs decreasing the values of the physical properties of the polymers. For example, temperatures in excess of 200° C. are required to liberate $CO_2$ from ethylene-, propylene- and glyceryl-carbonates and compounds of related structure. Even at this temperature, the rate of $CO_2$ liberation is too low to be practical. It is therefore a primary purpose of this invention to activate organic compounds of selected structures to effect liberation therefrom of $CO_2$ at temperatures below 200° C. preferably at temperatures lower than about 170° C., and for practical utility, of above about 100° C. This and other objectives of the invention will become evident as the description of this invention proceeds.

It has been discovered that the objectives of this invention may be achieved, at least in part, by facilitating the liberation of $CO_2$ from organic 1,2 carbonates, by means of chemical activators. These activator compounds are selected from the class of certain inorganic acid, bases and salts and function by lowering the temperature of $CO_2$ liberation and increasing the rate of liberation from organic compounds containing at least one 1,2 carbonate moiety,

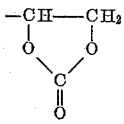

The 1,2 carbonates, or compounds containing the group

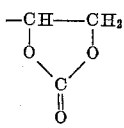

used in the practice of this invention may be liquid or solid compounds admixed in a polymer mass, or actually may be part of the polymer itself in homopolymers and copolymers of polymerizable compounds having within their structures a polymerizable >C=C< group and at least one

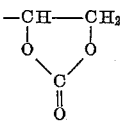

group, such as polymers and copolymers of compounds represented by the general formula:

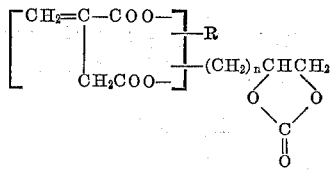

wherein R is a hydrocarbon radical or

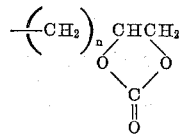

and $n$ is an integer of one to four as disclosed in my copending application Serial No. 196,430, filed May 21, 1962, or polymers and copolymers of compounds having the formula:

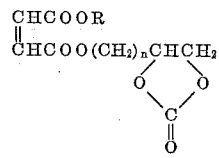

wherein R and $n$ have the same meaning as above, and as disclosed in my copending application Serial No. 196,484, filed May 21, 1962. Also falling within the scope of the present invention are polymers and copolymers of the acrylic and methacrylic esters represented by the formula,

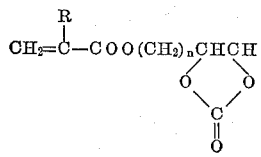

as disclosed in U.S. Patent 2,967,173, June 3, 1961. Other similar, or related polymers are the polymers of carbonate esters of alpha-chloroacrylic acid,

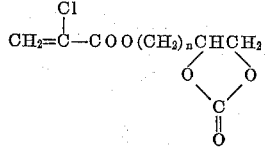

alpha-cyanoacrylic acid

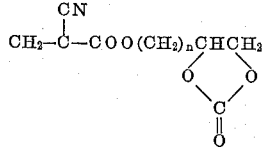

beta-cyanoacrylic acid

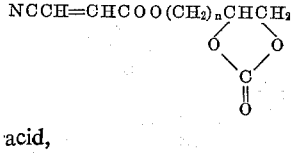

vinyl benzoic acid,

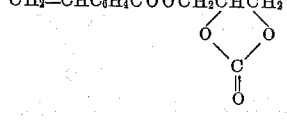

etc., as well as vinyl phenoxy-glyceryl carbonate,

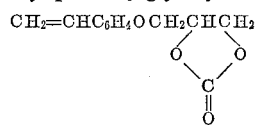

etc.

It is intended, therefore, to include within the scope of this invention polymers and copolymers of polymerizable compounds having at least one $$\begin{array}{c}-\mathrm{CH}\mathrm{-\!-\!-}\mathrm{CH}_2\\ \mathrm{O}\quad\mathrm{O}\\ \diagdown\!\mathrm{C}\diagup\\ \|\\ \mathrm{O}\end{array}$$

group in their structures. The activators used in the practice of this invention have a noticeable effect on the $CO_2$ liberation of polymers containing the $$\begin{array}{c}-\mathrm{CHCH}_2\\ \mathrm{O}\quad\mathrm{O}\\ \diagdown\!\mathrm{C}\diagup\\ \|\\ \mathrm{O}\end{array}$$

moiety as well as on non-monomeric compounds.

Thus, the 1,2 carbonates containing the $$\begin{array}{c}-\mathrm{CHCH}_2\\ \mathrm{O}\quad\mathrm{O}\\ \diagdown\!\mathrm{C}\diagup\\ \|\\ \mathrm{O}\end{array}$$

moiety may be simple compounds such as ethylene carbonate,

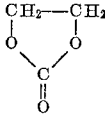

propylene carbonate,

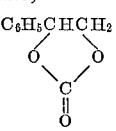

phenyl-ethylene carbonate,

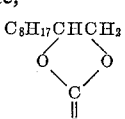

octylethylene carbonate,

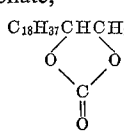

dodecyl-ethylene carbonate,

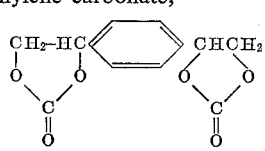

phenylene-diethylene carbonate, or such substituted carbonates such as glyceryl carbonate,

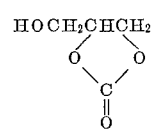

alpha-chloro-propane carbonate,

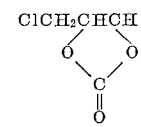

chloro-vinylene carbonate,

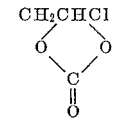

etc., or derivative compounds. They can also be even more complex substituted carbonates, for example, they may have the structure

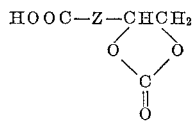

wherein Z is a divalent organic radical, such as are disclosed in my copending application Serial No. 196,470, filed May 21, 1962, and to which reference is hereby made. In this foregoing application it is shown that the nature of the divalent radical, Z, is not critical and, for this reason, the —COOH group may be attached in numerous ways and many forms. One convenient way of attaching a free carboxyl group is to prepare the hemiester of di- and poly-carboxylic acids and the 1,2 carbonates of alpha, beta, gamma alkane triols, containing three to six carbon atoms in the chain represented by the formula

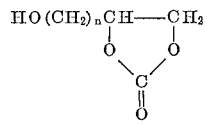

where $n$ is an integer having a value of one to four or more. Thus, one class of compounds falling within the scope of this invention are the hemi-esters of poly-carboxylic acids with the 1,2 carbonates of 1,2,3 propane triol; 1,2,4 butane triol; 1,2,5 pentane triol, etc. Such esters are readily prepared by reacting a poly-carboxylic acid anhydride with the alcohol. Typical examples of such cyclic poly-carboxylic acid anhydrides are carbon suboxide, succinic, the alkyl succinic, the halo-succinic, maleic, phthalic, itaconic, citraconic, the alkyl mercapto succinic, hexahydrophthalic, endomethylene phthalic, glutaric, 1,2,4,5 benzene tetracarboxylic, acetylene dicarboxylic, etc., anhydrides. Representing the anhydrides by the formula $X(CO)_2O$, the preparation of the half esters is in accordance with the equation:

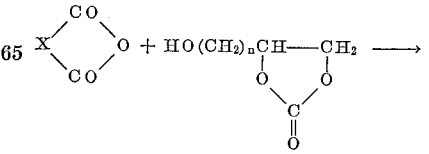

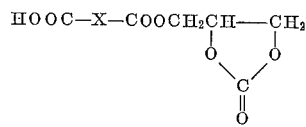

A specific illustration of this reaction is the preparation of the hemi-ester of succinic acid and glyceryl carbonate, thus

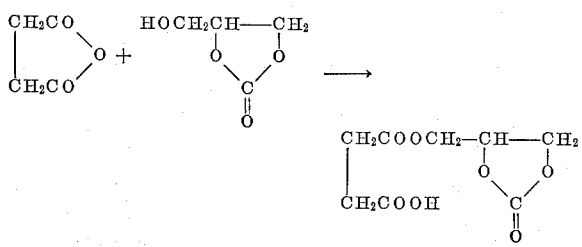

The esterification reaction using the anhydride may be performed simply by melting the two reactants together; but preferably to avoid the possibility of decarboxylation, the esterification is performed in an inert solvent such as heptane, hexane, benzene, toluene, dioxane, tetrahydrofurane, etc., and isolating the product or using it dissolved or dispersed in the reaction medium. The monoester thus formed may be used as such or as an intermediate for conversion to an alkali or alkali metal salt of the free carboxyl group, to —COOM, where M represents an alkali or alkali earth metal, such as sodium, potassium, lithium, calcium, magnesium, etc.

These esters may also be prepared directly from the poly-carboxylic acid in accordance with the general reaction,

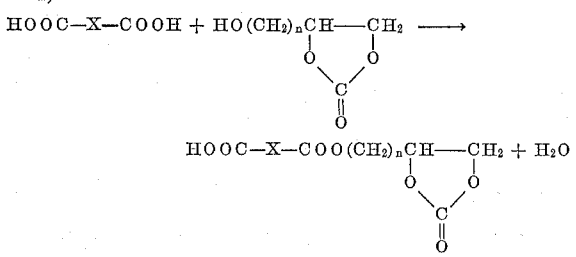

by heat alone, or in the presence of a small amount of an acidic esterification catalyst such as sulfuric, phosphoric, toluene sulfonic, etc., and preferably in the presence of an inert azeotroping agent, such as benzene or toluene, to remove the water of esterification continuously. By adjusting the ratio of polycarboxylic acid to the carbonate alcohol, the amount of any di-ester, if any, is reduced to a minimum.

The —COOM group required in the practice of the invention may be attached to the

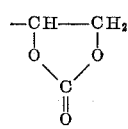

group in a number of other ways, as through an ether linkage. Thus, alpha-chloro-propane carbonate may be reacted with a hydroxy acid, or the alkali derivative of a hydroxy acid, such as

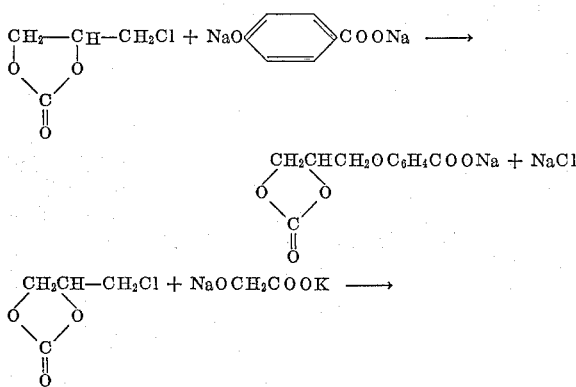

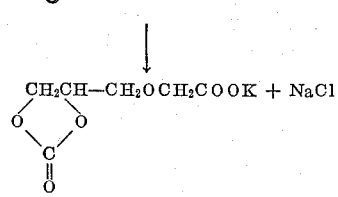

or alternately and inversely, the alcohol may be reacted with a haloacid, thus

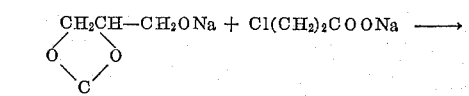

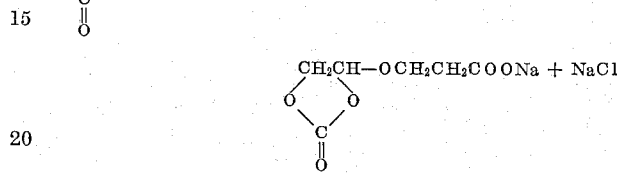

With chloroethylene carbonate, the substituent group is attached directly to the ring, thus

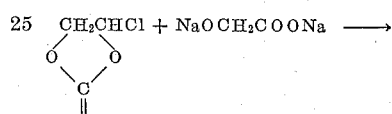

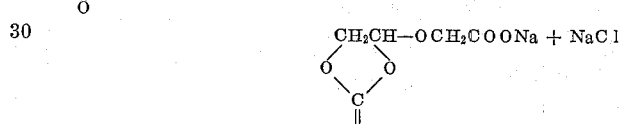

The substitution may also be through a sulfur atom or a nitrogen atom, thus

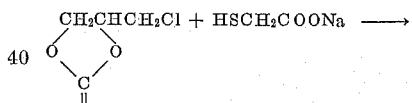

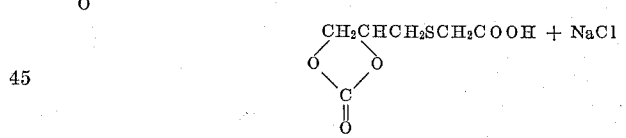

and

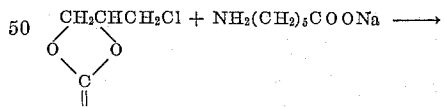

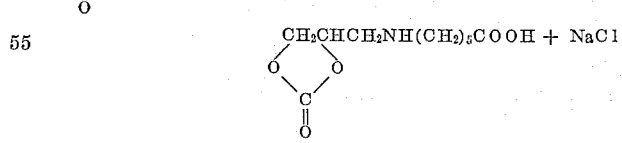

or directly through a carbon atom,

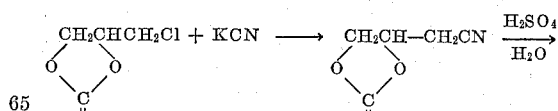

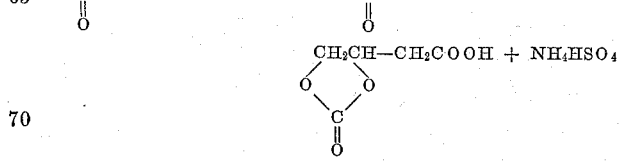

Whereas, the cyclic carbonates, free of carboxyl groups, such as ethylene carbonate, propylene carbonate, glyceryl carbonate, chloroethylene carbonate and alpha-chloropropene carbonate liberate $CO_2$ at temperatures in excess of 200° C., any of the compounds having a

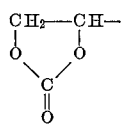

moiety in combination with a —COOM group will liberate $CO_2$ at temperatures below 17° C. regardless of the nature of the divalent radical —Z— between the two groups. The di-radical Z may, therefore, be aliphatic, including cyclo aliphatic and aromatic di-radicals, or a combination of aliphatic and aromatic structures in the di-radical, and the structure may be saturated or contain ethylenic or acetylenic unsaturation, the carbon atoms of which may be interrupted by hetero-atoms of oxygen, sulfur and nitrogen. The residual valencies of the carbon atoms in the di-radical —Z— not occupied by the carbonate

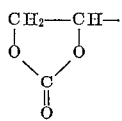

and the carboxylate moieties, —COOM, are occupied by hydrogen and by substituent R groups such as alkyl, aryl, alkaryl, aralkyl, alkoxy, aryloxy, carbalkoxy, acetoxy, halogeno, nitro, oxy, amino, imino, sulfo, sulfoxy, mercapto, etc., groups usually found as substituents for H in hydrocarbon radicals. This is so, because the nature of the di-radical —Z— between the —COOM and

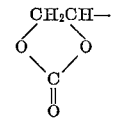

moieties is not critical for the purposes of this invention. Thus, the carbonate agents of this invention may be simple or complex compounds, and those compounds containing olefinic unsaturation may be monomers such as

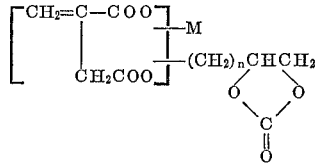

which are disclosed in my copending application, Serial No. 196,430, filed May 21, 1962, and

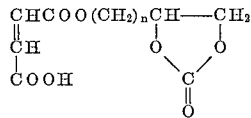

which are disclosed in my copending application, Serial No. 196,484, filed May 21, 1962, and to which reference is hereby made.

These compounds may be heated as such to cause $CO_2$ generation, or they may be used as polymers or copolymers, in which cases these monomers assume the repeating structures

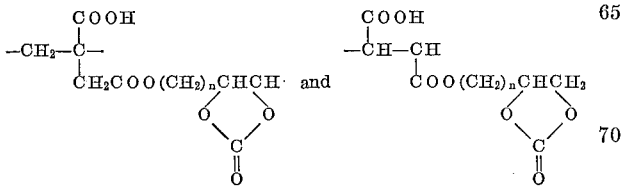

in the polymers and copolymers. To these units in the polymer are attached polymer chains, the nature of which depends on the number and the kind of monomers or comonomers used in preparing the polymerization product.

These polymers and copolymers, therefore, contain at least one —COOM group and at least one

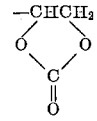

group joined by a divalent Z radical which, in the case of the itaconic half ester, is

and in the maleic half ester is

wherein P are polymer chains which may or may not contain the same repeating unit as the monomer. In the copolymers of vinyl acetate, the P units will be

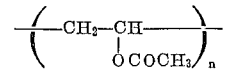

with styrene they are

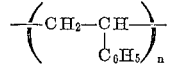

with methyl methacrylate they are

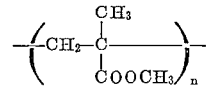

etc.

It is intended to include, within the scope of this invention, therefore, polymeric as well as non-polymeric compounds containing at least one —COOM and one

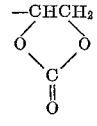

group.

Polymerization and copolymers afford, then, another method of preparing the compounds suitable for the practice of this invention, i.e., compounds containing at least one —COOM group and at least one

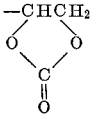

group. This can be achieved also when the monomeric carbonate does not contain the —COOM group by copolymerizing a second monomer containing a —COOM group with a monomer containing only

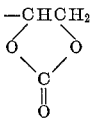

groups and no —COOM group. Monomers of this kind are disclosed in my copending applications mentioned hereinabove, and may be exemplified by the diesters of itaconic and maleic esters of the formulas

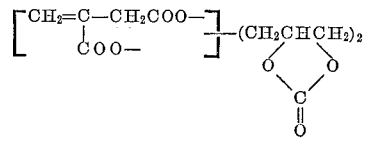

and

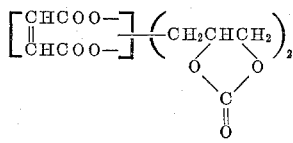

respectively. Another class of monomeric carbonates, free of COOM groups, are represented by the acrylates and methacrylates of the formula

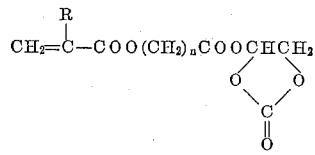

disclosed in U.S. Patent 2,967,173, January 3, 1961. By copolymerizing monomers of this type, with monomers containing a free —COOM group, satisfactory polymers containing at least one —COOM and at least one

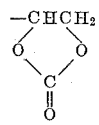

group suitable in the practice of this invention are obtained. Examples of suitable carboxylate containing monomers, are acrylic acid, methacrylic acid, alpha-chloroacrylic acid, maleic acid, maleic half esters, fumaric acid, fumaric acid half esters, itaconic acid, itaconic acid half esters, beta-cyanoacrylic acid, alpha-cyanoacrylic acid, vinyl benzoic acid, vinyl hydrogen succinate, vinyl hydrogen oxalate, allyl hydrogen phthalate, etc., the requirement being that this class of comonomers contains at least one —COOM group and one polymerizable —HC=CH— group. A few typical examples of such copolymers are

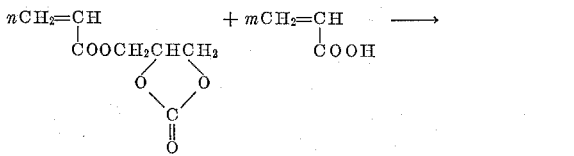

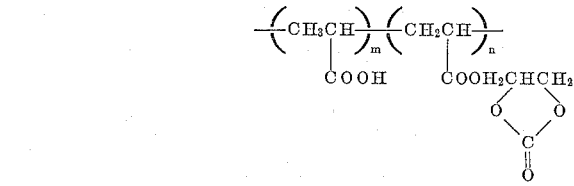

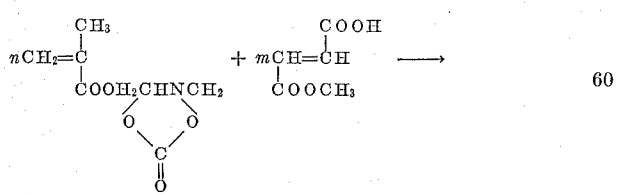

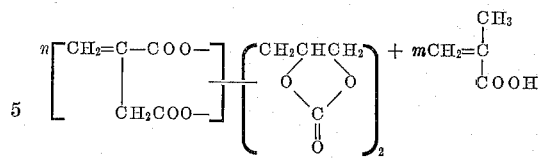

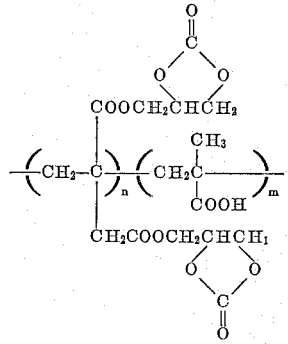

Though these polymers all liberate $CO_2$ at temperatures much lower than polymers not containing —COOM groups, the use of the activators of this invention also has a further influence on the temperature of $CO_2$ liberation. The temperature at which the nonmonomers, the monomeric, and the polymeric compounds of this invention containing a

moiety liberate $CO_2$ may be observed simply by heating the compounds and observing when $CO_2$ is liberated; in the case of this liquids this is associated with bubble formation, and with the polymer with an expansion in the volume of the polymer. When the temperature is raised above this incipienit temperature, the rate of $CO_2$ is increased according to thermodynamic and kinetic considerations, usually an approximate doubling of the rate for every ten degree increase in temperature. Thus, if the temperature of incipient $CO_2$ liberation is 160° C., then at 200° C., the $CO_2$ is liberated about eight times faster and the time at which the foaming mixture is required to be held at this temperature is greatly reduced, thereby either eliminating pyrolysis entirely, or reducing it to a very low and inconsequential degree.

For the production of foamed and expanded polymers the compounds of this invention may be added to the polymer mass before, during, of after polymerization, and thereafter heating to effect $CO_2$ liberation. The compound added may be non-monomeric, or if monomeric, will become part of the polymer mass by copolymerization when added before or during the polymerization; or if polymeric, and added before or during the polymerization, may be converted, at least in part, to a graft polymer. Or, if the compound is polymeric and is added to another preformed polymer, then a poly-blend foamed product is obtained. In those cases where the polymer itself contains —COOM and

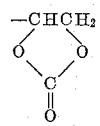

groups, or where a single monomer or a mixture of two or more monomers containing these groups, is heated, then internal foaming of the polymer mass occurs.

It was further discovered that the $CO_2$ liberating temperature and the rate of liberation from the compounds of this invention can be lowered and increased respectively by the addition of suitable activator catalysts, selected from the class of inorganic acids, bases and salts.

Of particular use are the oxides, hydroxides, carbonates, and sulfites of the groups IA, IB, IIA, IIB, and IIIA of the periodic table, such as LiOH, KOH, RbOH, CsOH, $Mg(OH)_2$, $Sr(OH)_2$, $Ba(OH)_2$, $Cu(OH)_2$, $Zn(OH)_2$, $B_2O_3$, $Cd(OH)_2$ $Al(OH)_2$ $Na_2O_2$, MgO, CaO, SrO, CuO, $Ag_2O$, ZnO, $Al_2O_3$, $Li_2CO_3$, $Na_2CO_3$, $MgCO_2$, $SrCO_3$ $BaCO_3$, $CuCO_3$, $ZnCO_3$ $Ag_2CO_3$, $CdCO_3$, $NaHCO_3$, $NaHSO_3$, $LiHSO_3$, etc. The inorganic acids such as sulfuric, phosphoric, hydrobromic, hydrochloric, chlorosulfonic acid, and their counterparts the organo-substituted inorganic acids such as benzene sulfonic, toluene sulfonic, naphthalene sulfonic, ethane sulfonic, phenyl phosphonic, etc., are also especially useful although in large quantities they may cause discoloration of the polymer masses. For this reason the metal salts which are the product of a week base and a strong acid or a strong acid or a strong base and a weak acid, are especially preferred, such as the chlorides, bromides, sulfates, and nitrates of Ti, Zr, V, Cr, Mn, Fe, Co, Ni, Cu, Zn, Al, Si, P, Ce, Cd, Sn, Sb, sodium citrate, sodium tartate, sodium lactate, zinc acetate, potassium phthalate, potassium bromate, potassium dichromate, lithium malonate, ferrous ammonium sulfate, etc. The "neutral" salts such as NaCl, KCl, etc. are not activators for the purpose of this invention.

As activators in this invention there is preferred substances selected from the class consisting of alkaline and alkaline earth oxides, hydroxides, and their salts formed with inorganic and organic acids, such as their carbonates, bicarbonates, sulfites, lactates, citrates, phthalates, etc., and the inorganic acidic salts of metals such as the halides, sulfates, and phosphates, etc., of the metals of the group IB, IIB, IIIA, IIIB, IVB, VB, VIB, VIIB, and VIII of the periodic table.

The activators employed in the practice of this invention can be used in a wide range of concentration varying from about 0.05% to 10% or even higher particularly in the case of the oxides, hydroxides, and carbonates in those instances where they neutralize a —COOH group, as for example about 23% when $Na_2CO_3$ is used to neutralize a homopolymer of itaconyl glyceryl carbonate,

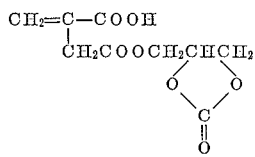

The mechanism making the activators of this invention effective is not fully understood but in some cases, the increased activity is probably due, especially in those compounds containing a COOH group, to the catalytic effect of the intermediate compound resulting from the neutralization of the carboxylic group by the oxides, hydroxide, carbonate or bicarbonate, thus —COOH+NaOH→—COONa+$H_2O$
—COOH+$NaHCO_3$→—COONa+$H_2O$+$CO_2$
2—COOH+$Na_2CO_3$→2—COONa+$H_2O$+$CO_2$
2—COOH+CaO→2—COOCa+$H_2O$ The neutralization can be effected before heating or may be performed while heating in the presence of the polymer, in which case, when the carbonates are used, an additional amount of $CO_2$ is liberated, economically, in situ, for foaming use. Other alkali salts such as sodium citrate, potassium tertrate, and monosodium malonate also act in a similar catalytic fashion and liberate additional amounts of $CO_2$ in the process. In other cases, such as in the cases where neutralization does not occur, the increase in activity is thought to be due to a direct catalytic effect, such as in the case of zinc chloride, ferrous sulfate, etc.

By selection of the appropriate compounds, a wider range of thermoplastic polymer types can be expanded by the process of this invention, such as the cellulose esters, as cellulose acetate, cellulose propionate, cellulose acetate-butyrate, ethyl cellulose, alkylene terephthalate, modified alkylene terephthalate, the polyolefines such as polyethylene, polypropylene, polybutene-1, polyalkenylaryl compounds such as polstyrene, polymethylstyrene, polychlorostyrene and their copolymers, polyvinyl chloride and its copolymers, polyacrylonitrile and its copolymers, the acrylates such as polyacrylate, polymethacrylate, the polychloroacrylate, the polycyanoacrylate and their copolymers, etc.

In those cases where the carbonate compound containing the

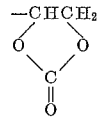

structure is a monomer and is copolymerized with other monomers, an even wider range of polymer composition can be prepared by selection of the monomers containing polymerizable vinyl, $CH_2=CH—$; vinylidene, $CH_2=C<$ and vinylene,

groups. Illustrative examples of such monomers are the acrylic esters such as methyl acrylate, ethyl acrylate hexyl acrylate, phenyl acrylate, benzyl acrylate, methyl-alpha-chloroacrylate, etc.; the methacrylic esters such as methyl methacrylate, ethyl methacrylate, propyl methacrylate, octyl methacrylate, benzyl methacrylate, etc.; the vinyl esters such as vinyl chloride, vinyl acetate, vinyl stearate, vinyl benzoate, vinyl chloroacetate, vinyl hydrogen phthalate, vinyl hydrogen succinate, etc.; the polymerizable amides and nitriles such as acrylamide, hydroxymethylacrylamide, methacrylamide, itaconic monoamides, itaconic diamide, acrylonitrile, methacrylonitrile, etc.; the alkenyl aryl compounds such as styrene, o-methyl styrene, p-methyl stryrene, alpha-methyl styrene, the chloro-styrenes, vinyl cyanobenzene, allyl benzene, etc.; the mono- and allyl esters such as allyl acetate, allyl hydrogen succinate, allyl hydrogen phthalate, dimethyl maleate, diethyl fumarate; the vinylidene compounds such as vinylidene chloride, vinylidene cyanide, methylene malonic esters, etc.; vinylene compounds such as vinylene carbonates, maleic anhydride, maleic and fumaric monoesters; the itaconic compounds such as itaconic anhydride, the itaconic mono- and the itaconic diesters of the lower and higher aliphatic alcohols; the dienes such as butadiene, isoprene, 2-chlorobutadiene 1,3 and the like. The proportion of the new monomers in copolymers with other monomers will depend, in accordance with the accepted principles of copolymerization, on the reactivity and selectivity constants, $r_1$ and $r_2$, of the monomers used in preparing the copolymer, the ratio of the monomers used and the extent of conversion. However, by selecting appropriate conditions for the copolymerization, copolymers, using the new monomers of this invention, can be made to contain effective and small amounts of these new monomers, for example, of the order of from 0.1% to 0.5% to very high amounts of the order of 99.5% to 99.9% in the final polymer products.

The monomers used in this invention can be polymerized by the known methods used to polymerize acrylic, methacrylic, itaconic, or maleic or styrene type monomeric compounds. The monomers, in the presence or absence of other polymerizable >C=C< containing monomers, can be polymerized in bulk, solution, emulsion, or suspension with or without polymerization initiators and other modifiers. As polymerization initiators there can be used the per-compounds, such as potassium persulfate, tertiary butyl peracetate, benzoyl peroxide, cumene hydroperoxide, tertiary butyl peroxide, tertiary butyl perbenzoate, hydrogen peroxide with or without ferrous salts, etc.; the azo catalysts such as alpha, alpha′,azobis(isobutyronitrile), ultraviolet light in the absence or presence of ketones, ionizing radiation from X-rays, electron and particle accelerators, cobalt 60 sources, etc.

In solution polymerization, the medium can be selected from solvents which retain the polymer in solution throughout the polymerization, or can be chosen so that the polymer precipitates when formed and can be selected from the class of aliphatic, cycloaliphatic and aromatic hydrocarbons, esters, ethers, ketones, halogenated hydrocarbons etc.; or mixtures thereof depending on the form in which the polymer is desired. When halogenated hydrocarbons are used, they also act as modifiers of the polymerizations. In emulsion polymerization, the emulsifying agent to be used in the aqueous system is selected from the class of fatty acid soaps, salts of sulfonated alkyl benzenes, polyvinyl alcohol, gelatin, polyacrylic acid, salts of styrene-maleic acid polymers, gelatin and the like, which can be used alone or with buffering agents such as sodium acetate, borax, trisodium phosphate and the like. In suspension polymerization, the dispersion agent can be selected from the class of insoluble inorganic carbonates, phosphates and silicates to be used alone or in the presence of minor amounts of deflocculating agents such as sodium dodecylbenzene sulfonate or potassium stearate. The products obtained by solution, emulsion, or suspension process may be used as prepared or the polymers may be isolated and further compounded with dyes, lubricants, etc., before heating and molding or extruding to the desired form or shape. As indicated for the polymers and copolymers, the amount of compound containing the

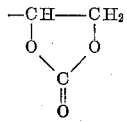

group used may vary from small quantities of the order of 0.5% to polymers of monomers having about 100% such structure. However, depending on the molecular weight of the compound and the amount of $CO_2$ desired, the lower amounts may be of the order of 1 to 5% of the total mass. When the group

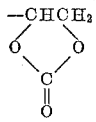

is an intrinsic part of the polymer structure, then crosslinking of the polymer occurs together with foaming.

In the practice of this invention, the organic carbonates are cyclic 1,2 carbonates whose structural requirements are

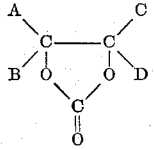

in which the nature of the substituents A, B, C, D are not critical, and as indicated, may be hydrogen, alkyl, ester groups, ether groups even to the extent of being polymeric with the wide diversity available in monomeric structures.

The following examples illustrate the practice of this invention, and are not given by way of limitation but only in illustration. The parts and percentages used are by weight unless otherwise specified.

EXAMPLE I

Maleic anhydride 73.5 parts, 88.5 parts of glyceryl carbonate,

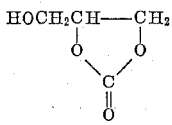

are added to 500 parts of benzene in a reaction vessel equipped with stirrer, condenser, and heating means, and the mixture heated at 60° C. for 48 hours. Upon standing at room temperature, the desired ester crystallizes and when separated from the benzene by filtration will be in an almost quantitative yield. The crude ester can be used as such or may be recrystallized from water. The ester product has a melting point of 112–114° C.

Elemental analysis for C and H gives values of 44.96% and 3.77% respectively, which is in excellent agreement with the calculated values of 44.44% and 3.70% respectively, for the compound, 4-(1,3-dioxolone-2) methyl hydrogen maleate, corresponding to the formula

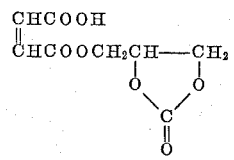

EXAMPLE II

The procedure of Example I is repeated using the 1,2 carbonate of 1,2,6 hexanetriol instead of glyceryl carbonate, and there is obtained the corresponding maleate of the formula

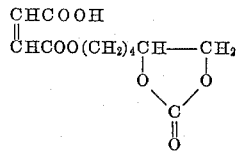

which on analysis for C and H and acid number determination gives values in close agreement with the theoretical values for the compound.

When the hexanetriol carbonate of this example is replaced by an equivalent amount of the homologous carbonates, such as

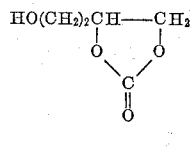

and

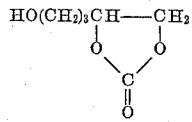

then the corresponding esters are obtained.

EXAMPLE III

Itaconic anhydride 84.0 parts and 88.5 parts of glyceryl carbonate,

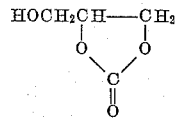

are added to 500 parts of benzene in a reaction vessel equipped with stirrer, condenser, and heating means, and the mixture heated at 60° C. for 48 hours, following which it is cooled to room temperature. The desired ester crystallizes on standing and is removed from the benzene by filtration to give an almost quantitative yield. The crude ester can be used as such or recrystallized from water, and has a melting point of 132–134° C.

Elemental analysis for C and H and molecular weight determinations give values of 46.85% and 4.57% respectively, which is in excellent agreement with the calculated values of 47.0% and 4.35% respectively, for the compound, 4-(1,3-dioxolone-2) methyl hydrogen itaconate, corresponding to the formula $$CH_2=C-COOH$$
$$\quad\ \ |$$
$$\quad CH_2COOCH_2CH\!\!-\!\!-\!\!-\!\!CH_2$$
$$\qquad\qquad\qquad\quad O\ \ \ \ \ \ \ O$$
$$\qquad\qquad\qquad\quad \ \backslash C\!\!\diagup$$
$$\qquad\qquad\qquad\qquad \ \|$$
$$\qquad\qquad\qquad\qquad \ O$$

EXAMPLE IV

The procedure of Example III is repeated using an equivalent amount of the 1,2 carbonate of 1,2,4 butanetriol instead of glyceryl carbonate, and there is obtained the corresponding itaconate of the formula, $$CH_2=C-COOH$$
$$\quad\ \ |$$
$$\quad CH_2COO(CH_2)_2CH\!\!-\!\!-\!\!-\!\!CH_2$$
$$\qquad\qquad\qquad\qquad\ O\ \ \ \ \ \ \ O$$
$$\qquad\qquad\qquad\qquad\ \ \backslash C\!\!\diagup$$
$$\qquad\qquad\qquad\qquad\quad \|$$
$$\qquad\qquad\qquad\qquad\quad O$$

which on analysis for C and H and acid number determination give values in close agreement with the theoretical values for the compound.

When the butanetriol carbonate of this example is replaced by an equivalent amount of the homologous carbonates, such as $$HO(CH_2)_3CH\!\!-\!\!-\!\!-\!\!CH_2 \text{ and } HO(CH_2)_4CH\!\!-\!\!-\!\!-\!\!CH_2$$
$$\qquad\quad\ \ O\ \ \ \ \ \ O\qquad\qquad\qquad\ \ O\ \ \ \ \ \ O$$
$$\qquad\quad\ \ \ \backslash C\!\!\diagup\qquad\qquad\qquad\qquad\ \backslash C\!\!\diagup$$
$$\qquad\qquad\ \|\qquad\qquad\qquad\qquad\qquad \|$$
$$\qquad\qquad\ O\qquad\qquad\qquad\qquad\qquad O$$

then the corresponding esters are obtained.

EXAMPLE V

One mole of phthalic anhydride is reacted with one mol of glyceryl carbonate by the procedure of Example I and the isolated half ester is recrystallized from water. The melting point is 104–106° C. Elemental analysis of the product gives values of 53.87% C. and 3.86% H which are in good agreement with the calculated values of 54.13% C and 3.76% H, for the compound $$HOOC\quad\ \ COOCH_2CH\!\!-\!\!-\!\!-\!\!CH_2$$

EXAMPLE VI

One mole of succinic anhydride (100 parts) is reacted with one mole of glyceryl carbonate (118 parts) by the procedure of Example I, using 1100 parts hexane as the dilutent. The ester, recrystallized from benzene-ethyl alcohol mixtures, has a melting point of 101° C. Elemental analysis of the product gives values of 44.11% C and 4.59% H, which are in good agreement with the calculated values of 44.04% C and 4.83% H for the compound, $$HOOC-CH_2CH_2COOCH_2CH\!\!-\!\!-\!\!-\!\!CH_2$$

EXAMPLE VII

By heating together at a temperature of from 80–110° C. one mole of glyceryl carbonate and one mole of phthalic anhydride for a period of 12–24 hours, a product identical to that of Example V is obtained in a 95–100% yield.

EXAMPLE VIII

The melt procedure is again illustrated by the heating together at a temperature of from 100–110° C. of one mole of glyceryl carbonate and one mole of succinic anhydride for a period of 10–22 hours, through which is obtained in a 92% yield a product identical to that of Example VI.

EXAMPLE IX

One mole of glyceryl carbonate and one mole of allyl succinic anhydride are reacted by the procedure of Example I and there is obtained the compound, $$\left[\begin{array}{l}CH_2=CHCH_2CHCO-\\ \qquad\qquad\quad\ \ |\\ \qquad\qquad\quad CH_2CO-\end{array}\right]\!\!\begin{array}{l}-OH\\ -OCH_2CH\!\!-\!\!-\!\!-\!\!CH_2\end{array}$$

EXAMPLE X

One mole of glyceryl carbonate and one mole of dodecylene succinic anhydride are reacted by the procedure of Example VIII and there is obtained the crude compound, $$\left[\begin{array}{l}C_{12}H_{23}CH\!\!-\!\!-\!\!-\!\!CO-\\ \qquad\qquad\ |\\ \qquad\qquad CH_2CO-\end{array}\right]\!\!\begin{array}{l}-OH\\ -OCH_2CH\!\!-\!\!-\!\!-\!\!CH_2\end{array}$$

EXAMPLE XI

By utilizing the solution procedure of Example I or the melt procedures of Examples VII and VIII, the following anhydrides are converted to their corresponding half esters of glyceryl carbonate: 1-chlorosuccinic anhydride; 1,2-dichlorosuccinic anhydride; methyl mercapto-succinic anhydride (or S-methyl thiomalic acid anhydride); S-acetylthiomalic anhydride; tetrahydrophthalic anhydride; hexahydrophthalic anhydride; endomethylene tetrahydrophthalic anhydride; 3-chlorophthalic anhydride; 3-nitrophthalic anhydride; and glutaric acid anhydride.

EXAMPLE XII

The procedure of Example I is repeated using 2 moles of glyceryl carbonate and one mole of 1,2,4,5 benzenetetracarboxylic acid anhydride and there is obtained the compound

EXAMPLE XIII

To determine the temperature at which $CO_2$ is liberated, a number of 1,2 carbonates are treated as follows: twenty (20) ml. of the carbonate are introduced in a 50 ml. test tube in which is inserted a thermometer and the tube placed in a high boiling liquid bath. The bath is slowly heated until $CO_2$ is generated in the mixture within the test tube. The initial temperature of gas liberation is recorded in Table 1.

Table 1
TEMPERATURES OF $CO_2$ LIBERATION OF ORGANIC CYCLIC CARBONATES

| Compound Name | Structure | °C. Temperature of $CO_2$ Elimination |
|---|---|---|
| 1. Ethylene Carbonate | Cyclic carbonate of $CH_2$—$CH_2$ (ring: $CH_2$–O–C(=O)–O–$CH_2$) | 208–210 |
| 2. Propylene Carbonate | Cyclic carbonate of $CH_3CH$—$CH_2$ | >220 |
| 3. Glycerine Carbonate | $HOCH_2CHCH_2$ with cyclic carbonate on the –CHCH$_2$– | 206 |
| 4. Alpha-chloro-propane Carbonate | $ClCH_2CHCH_2$ with cyclic carbonate | 220–225 |
| 5. Acrylyl Glyceryl Carbonate | $CH_2=CHCOOCH_2CHCH_2$ with cyclic carbonate | 216 |
| 6. Itaconyl Glyceryl Carbonate | $CH_2=C(CH_2COOCH_2CHCH_2\text{-carbonate})COOCH_2CHCH_2\text{-carbonate}$ | 219 |
| 7. Methyl Maleyl Glyceryl Carbonate | $CHCOOCH_3$ ‖ $CHCOOCH_2CHCH_2$ with cyclic carbonate | 221 |
| 8. Maleyl Glyceryl Carbonate | $CHCOOCH_2CHCH_2$ ‖ $CHCOOCH_2CHCH_2$ each with cyclic carbonate | 218 |
| 9. Succinyl Monoglyceryl Carbonate | $CH_2COOH$ ∣ $CH_2COOCH_2CHCH_2$ with cyclic carbonate | 140 |
| 10. Maleyl Monoglyceryl Carbonate | $CHCOOH$ ‖ $CHCOOCH_2CHCH_2$ with cyclic carbonate | 150–160 |

Table 1—Continued

| Compound Name | Structure | °C. Temperature of CO₂ Elimination |
|---|---|---|
| 11. Phthalyl Glyceryl Carbonate | HOOC—C₆H₄—COOCH₂CHCH₂ (with cyclic carbonate —O—C(=O)—O—) | 125–135 |
| 12. Itaconyl Monoglyceryl Carbonate | CH₂=C—COOH<br>    \|<br>CH₂COOCH₂CHCH₂ (with cyclic carbonate —O—C(=O)—O—) | 135–140 |

It is readily observable that those carbonates (compounds) 9–12 inclusive) which contain a free —COOH group have a $CO_2$ elimination temperature lower by 50 or more degrees C. than the noncarboxyl containing carbonates such as compounds 1–8 inclusive.

EXAMPLE XIV

Instead of prereacting succinic anhydride and glyceryl carbonate to prepare and isolate the half ester as in Example VI and thereafter heating to 140° C. as in Example XIII to release $CO_2$, one mole of succinic anhydride and glyceryl carbonate are mixed and heated at 140–150° C., resulting in the liberation of $CO_2$ together with a residual viscous resin which, on continued heating, becomes infusible.

EXAMPLE XV

One mole of succinic acid (118 parts) and one mole of glycerine carbonate (118 parts) are mixed at room temperature and then heated until $CO_2$ liberation is observed. Initial $CO_2$ release occurs at 140–142° C., whereas the glyceryl carbonate requires a temperature of about 200° C. Continued heating of the mixtures leaves a resinous residue similar to that obtained by heating the succinic half ester of Example XIV.

EXAMPLE XVI

One mole of adipic acid (146 parts) and one mole of glyceryl carbonate are mixed and heated as in the procedure of Example XV. $CO_2$ liberation is observed at 138–141° C., whereas glycerine carbonate requires a temperature of about 200° C.

When 0.04 mole of adipic acid (5.9 parts) are used instead of the one mole of this example, even then, the temperature of $CO_2$ liberation is reduced to about 175° C. compared to an initial temperature of about 200° C. for the original carbonate.

EXAMPLE XVII

To one mole of the product of Example VI in benzene-alcohol mixture is added one mole of KOH dissolved in ethyl alcohol and the mixture concentrated to dryness under a reduced pressure of 15 mm., leaving as a residue the compound,

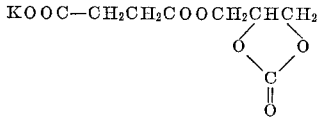

KOOC—CH₂CH₂COOCH₂CHCH₂ (with cyclic carbonate)

which when heated to 150° C. liberates $CO_2$.

EXAMPLE XVIII

The succinic half ester of Example XVI is mixed with 20% by weight of $Na_2CO_3$ and heated to 120–130° C., liberating $CO_2$ from the $Na_2CO_3$, and thereafter by heating the resulting

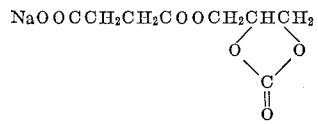

NaOOCCH₂CH₂COOCH₂CHCH₂ (with cyclic carbonate)

at 150° C. further $CO_2$ is liberated from the organic carbonate.

Instead of sodium carbonate, other carbonates such as sodium bicarbonate, potassium carbonate, lithium carbonate, calcium carbonate, barium carbonate, and magnesium carbonate, etc. may be used as the inorganic source of $CO_2$ with similar results.

EXAMPLE XIX

The maleic half ester of Example I is mixed with a number of inorganic activators and the temperature at which $CO_2$ liberation occurs recorded as in Table 2.

Table 2

TEMPERATURE OF $CO_2$ LIBERATION FROM

CHCOOH
‖
CHCOOCH₂CHCH₂ (with cyclic carbonate)

| Activator | Percent by Weight on Ester | Initial Temperature of $CO_2$ Liberation |
|---|---|---|
| None | | 150–160 |
| FeSO₄ | 1 | 120 |
| NaHSO₄ | 1 | 112 |
| CeSO₄ | 1 | 118 |
| H₃PO₄ | 10 | 82 |
| H₃PO₄ | 1 | 107 |
| ZnCl₂ | 1 | 120 |
| Na₂CO₃ | 1 | 112 |

EXAMPLE XX

Example XIX is repeated with the itaconyl monoglyceryl carbonate instead of the maleyl derivative and a similar improvement in $CO_2$ liberation is observed as shown in Table 3.

Table 3

TEMPERATURE OF CO₂ LIBERATION FROM

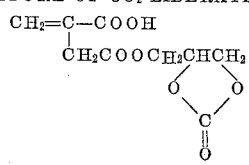

| Activator | Percent by Weight on Ester | Initial Temperature ° C. of CO₂ Liberation |
|---|---|---|
| None | ------ | 160–165 |
| FeSO₄ | 2 | 122 |
|  | 1 | 116 |
| ZnCl₂ | 2 | 114 |
|  | 1 | 121 |
| Na₂CO₃ | 1 | 114 |
|  | 3 | 114 |
| C₆H₅SO₃H | 0.5 | 107 |

EXAMPLE XXI

Example XX is repeated using (a) succinyl mono-glyceryl carbonate, (b) phthalyl glyceryl carbonate and (c) dodecylene succinyl glyceryl carbonate and a decrease in the temperature of $CO_2$ elimination of the same order as is observed for the itaconyl derivative, is found for these esters.

EXAMPLE XXII

The effect of a number of activators on ethylene carbonate is evaluated by the procedure of Example XX and the results are tabulated in Table 4.

Table 4

| Activator | Percent by Weight | Initial Temperature ° C. of CO₂ Elimination |
|---|---|---|
| None | ------ | 208–210 |
| NaOH | 5 | 122 |
| FeSO₄ | 5 | 106 |
| Na₂CO₃ | 5 | 98 |
| NaHSO₄ | 5 | 147 |
| ZnCl₂ | 5 | 100 |
| H₃PO₄ | 5 | 130 |
| SnCl₂ | 5 | 95 |
| SnCl₄ | 5 | 85 |
| NaHSO₃ | 5 | 120 |
| K₂CO₃ | 5 | 125 |
| Fe(NH₃)₂SO₄ | 5 | 170 |
| FeSO₄ | 5 | 128 |
| (COOH)₂ | 5 | 127 |
| CH₃C₆H₄SO₃H | 5 | 97 |
| LiOH | 2 | 120 |
| Zn(OH)₂ | 1 | 149 |
| Ba(OH)₂ | 0.1 | 129 |

EXAMPLE XXIII

The effect of a number of activators on propylene carbonate is evaluated by the procedure of Example XX and the results are tabulated in Table 5.

Table 5

| Activator | Percent by Weight | Initial Temperature ° C. of CO₂ Elimination |
|---|---|---|
| None | ------ | >220 |
| H₃PO₄ (85%) | 5 | 105 |
| H₂SO₄ | 5 | 95 |
| CH₃C₆H₄SO₃H | 5 | 85 |
| FeSO₄ | 5 | 120 |
| Fe₂(SO₄)₃ | 5 | 130 |
| C₆H₅COOH | 5 | 180 |
| ClCH₂COOH | 5 | 178 |
| Fe(NH₃)₂SO₄ | 5 | 146 |
| C₁₀H₇SO₃H | 5 | 65 |
| Al₂O₃ | 5 | 112 |
| CaO | 5 | 154 |
| C₆H₄(COOK)₂ | 5 | 178 |
| ZrCl₄ | 5 | 80 |
| K₂HSO₄ | 5 | 154 |
| K₂CO₃ | 5 | 151 |
| KBrO₃ | 5 | 180 |
| K₂Cr₂O | 5 | 175 |

EXAMPLE XXIV

The procedure of Example XXIII is repeated using glyceryl carbonate instead of propylene carbonate and the results are tabulated in Table 6.

Table 6

| Activator | Percent by Weight | Initial Temperature ° C. of CO₂ Elimination |
|---|---|---|
| None | ------ | 206 |
| Na₂CO₃ | 2 | 80 |
|  | 5 | 80 |
| NaOH | 2 | 108 |
|  | 5 | 108 |
| ZnCl₂ | 2 | 78 |
|  | 5 | 78 |
| AlCl₃ | 2 | 78 |
|  | 5 | 68 |
| CH₃COONa | 2 | 110 |
|  | 5 | 110 |
| PbO | 5 | 135 |
| SnCl₂ | 5 | 95 |
| H₃PO₄ (85%) | 5 | 85 |
| SnCl₄ | 5 | 125 |
| H₂SO₄ | 5 | 75 |
| CH₃C₆H₄SO₃H | 5 | 75 |
| FeSO₄ | 5 | 150 |
| (Fe)₂(SO₄)₃ | 5 | 140 |
| C₁₀H₇SO₃H | 5 | 152 |
| CaO | 5 | 125 |
| Al₂O₃ | 5 | 118 |
| C₆H₄(COOK)₂ | 5 | 152 |
| C₆H₅COOH | 5 | 170 |
| (CH₂CH₂COOH)₂ | 5 | 175 |

EXAMPLE XXV

The procedure of Example XXIII using alpha-chloropropane carbonate instead of propylene carbonate and the results are tabulated in Table 7.

Table 7

| Activator | Percent by Weight | Initial Temperature ° C. of CO₂ Elimination |
|---|---|---|
| None | ------ | 220 |
| H₃PO₄ | 5 | 130 |
| NaOH | 5 | 170 |
| FeSO₄ | 5 | 106 |
| Na₂CO₃ | 5 | 98 |
| NaHSO₄ | 5 | 147 |
| ZnCl₂ | 5 | 100 |

EXAMPLE XXVI

A copolymer of 90 parts of styrene and 10 parts of itaconyl glyceryl carbonate,

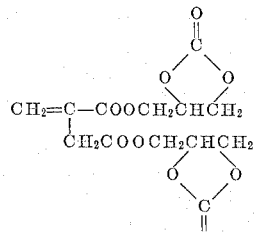

is heated to 200° C. and very little $CO_2$ elimination is observed. When 97 parts of this copolymer and 3 parts of $ZnCl_2$ are intimately mixed and heated to 180° C., $CO_2$ elimination is observed which increases markedly at 200° C. Similar results are obtained with homopolymers and copolymers of the acrylic and methacrylic esters of the alcohols

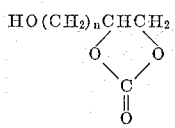

wherein $n$ has a numerical value of 1 to 4.

EXAMPLE XXVII

One hundred parts of methyl methacrylate, 7.5 parts of 4-(1,3 dioxolone-2), methylene hydrogen dodecylene succinate of Example X and 0.1 part of benzoyl peroxide are mixed and heated at 50–75° C. for 72 hours or until hard, and then at 100° C. for 24 hours. On heating the polymer at 150° C., foaming occurs and a foamed structure is obtained on cooling to below 100° C.

EXAMPLE XXVIII

To a reaction vessel equipped with a stirrer, 350 parts of distilled water, 3.5 parts of hydroxy apatite, 425 parts of styrene containing 0.85 parts of benzoyl peroxide and 0.2 part of tertiary butyl perbenzoate, and 0.015 part of sodium dodecylbenzene sulfonate are added and mixed thoroughly while the system is purged with nitrogen. The reactor is then heated to 90° C. over a period of one hour and maintained at this temperature for 6–7 hours, following which it is heated in the course of one hour to 115° C. and maintained at this temperature for 2.5–3 hours, following which it is cooled to room temperature; the beads separated from the water by filtration, followed by washing with dilute hydrochloric acid and then with distilled water. The beads may be used in a wet condition or dried to remove the small amounts of surface water associated with them. Most of the beads range in the size of 10–30 mesh.

Instead of the hydroxy apatite, other suspension agents such as polyvinyl alcohol, sodium polyacrylate, the soluble salts of styrene-maleic anhydride polymers, etc., may be used in preparing the polymer beads.

EXAMPLE XXIX

Example XXVIII is repeated to the end of the 2.5–3 hour reaction at 115° C., following which the reaction mass is cooled to 90° C. and 45 parts of petroleum ether of boiling range 40–70° C. is added under pressure and the system maintained at 90° C. for 4–5 hours. The reaction mass is cooled to room temperature, washed with dilute hydrochloric acid and isolated as in Example XXVIII.

EXAMPLE XXX

One hundred parts of the polystyrene of Example XXVIII and 5 parts of the compound of Example VI,

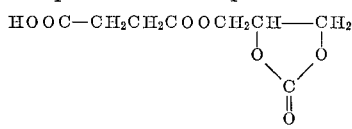

are dry blended and when the mixture is heated to 170° C., a foamed polymer is obtained.

When the same composition is processed in an extruder, a continuous foamed product is obtained. If to the mixture, before extrusion, there is added and blended 3 parts of sodium carbonate or sodium citrate, a foamed product of lower density and of higher uniformity is obtained at lower temperatures. Similar improvements on foaming in the presence of these salts are observed when ethylene carbonate, propylene carbonate, and glyceryl carbonate are used instead of the succinyl compounds.

EXAMPLE XXXI

When the procedure of Example XXX is repeated using the polymer of Example XXIX in an extruder provided with a slit-die to form a thin sheet of about ⅛″, a more uniform foamed sheet product is obtained when the monosuccinyl glyceryl carbonate, or monosuccinyl glyceryl carbonate with sodium carbonate or sodium citrate, is added to the dry or wet polystyrene containing the petroleum ether.

EXAMPLE XXXII

When the procedure of Example XXXI is repeated using the wet polystyrene sample of Example XXVIII, 6 parts of the hexane dispersion of the organic carbonate of Example VI, and one part of sodium carbonate, foamed products similar to those of Example XXXI are obtained.

EXAMPLE XXXIII

Itaconyl monoesters of glyceryl carbonate are copolymerized with styrene, methyl methacrylate, methyl acrylate and vinyl acetate according to the procedures of Examples VI, VII, VIII, and IX of my copending application, Serial No. 196,430 (referred to hereinabove). Each of these copolymers contains both —COOH and

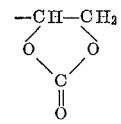

groups derived from the comonomer

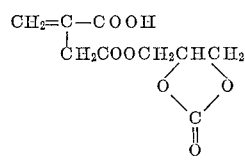

Heating of these polymers at temperatures of 160–200° C. results in $CO_2$ liberation and expansion of the polymer mass.

More effective foaming at lower temperatures is achieved by reacting these polymers in the presence of, or with, activators such as $NaHCO_3$, $Na_2CO_3$, $ZnCl_2$ and $FeSO_4$.

EXAMPLE XXXIV

Example XXXIII is repeated using the copolymers of the maleic half ester of glyceryl carbonate instead of the itaconic esters. The maleic esters copolymers also contain the —COOH and

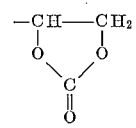

groups, and are disclosed in my copending application Serial No. 196,430, referred to hereinabove. With the maleic esters, results similar to those of Example XXXIII are obtained.

EXAMPLE XXXV

Ninety three (93) parts of styrene, 5 parts of

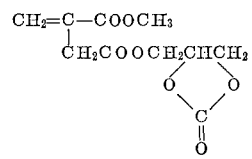

2 parts of acrylic acid are combined in 500 parts of acetone containing one part of 2,2′azobis-isobutyronitrile and polymerized at 60–70° C. for 48 hours. The polymer is isolated by precipitation with methanol and dried. Heating of this copolymer at 150° C. causes $CO_2$ liberation with crosslinking at a much more rapid rate than in a similar copolymer containing no acrylic acid, and therefore, no —COOH groups in its structure. When 2% $FeSO_4$ or $ZnCl_2$ is added to the copolymer and the mixture heated to 150° C., a still more rapid liberation of $CO_2$ occurs.

Substitution of the acrylic acid by methacrylic acid, vonyl benzoic acid, itaconic acid, maleic acid, fumaric acid, half esters such as the methyl ethyl, propyl, benzyl, phenyl, etc., ester of maleic, fumaric, itaconic, the cyanoacrylic acids, the chloroacrylic acid, etc., produce a similar acceleration in the rate of $CO_2$ elimination, which is further increased by the addition of activators.

EXAMPLE XXXVI

Example XXV is repeated using 3 parts of

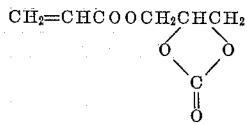

instead of the itaconate, and similar results are obtained.

When styrene is replaced in whole or in part by other monomers, such as methyl methacrylate, dimethyl itaconate, etc., crosslinked expanded copolymers are obtained.

EXAMPLE XXXVII

When Example XXX is repeated using plasticized cellulose acetate, cellulose-aceto-butyrate, ethyl cellulose, polyvinyl acetate, plasticized polyvinyl chloride, vinyl chloride-dibutyl maleate copolymer, vinyl chloride-vinyl acrylate copolymer, styrene-acrylonitrile copolymers, polyethylene, polypropylene, polybutene-1, ethylene-propylene copolymers, ethylene-vinyl acetate copolymers, ethylene-acrylonitrile copolymers, modified ethylene terephthalate, such as the succinic and adipic acid modified polymerizates, polycaprolactam (nylon 6), polyhexamethylene adipamide (nylon 6–6), acrylonitrile-butadiene-styrene terpolymers, styrene-butadiene copolymers, expanded polymeric structures are obtained.

It will be obvious that considerable variation in the component elements of the newly discovered compounds, the manner of their utilization as foaming agents for synthetic resinous compositions, and their activation are possible without departing from the spirit of the invention or the scope of the appended claims.

What I claim is:

1. The process of foaming synthetic thermoplastic polymers which comprises heating to release a foaming gas, at a temperature of at least 100° C., a polymer which is softened at such temperature, said polymer containing as a chemically combined derivative, at least one member of the class consisting of an organic carbonate of the general formula $$R-CH-CH_2$$
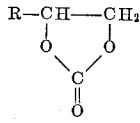

where R is $$HOOC-CH-CH_2COOCH_2-$$
$$|$$
$$C_{12}H_{23}$$

$$CH_2=C-COOR_1$$
$$|$$
$$CH_2$$
$$|$$
$$COO(CH_2)_n-$$

$$CH-COOR_1$$
$$||$$
$$C$$
$$|$$
$$COO(CH_2)_n-$$

$$CH_2-CH_2-COOR_1$$
$$|$$
$$COO(CH_2)_n-$$

where $R_1$ is selected from at least one member of the class consisting of

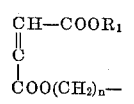

$$Cl$$
$$|$$
$$C=CH_2$$
$$|$$
$$COO(CH_2)_n-$$

$$CN$$
$$|$$
$$C=CH_2$$
$$|$$
$$COO(CH_2)_n-$$

$$CH-CN$$
$$||$$
$$CH$$
$$|$$
$$COO(CH_2)_n-$$

$$CH=CH_2$$
$$|$$
$$C_6H_3$$
$$|$$
$$COO(CH_2)_n-$$

$$CH=CH_2$$
$$|$$
$$C_6H_4$$
$$|$$
$$O$$
$$|$$
$$CH_2-$$

$$C_6H_5-$$

$$C_8H_{17}-$$

$$C_{18}H_{37}-$$

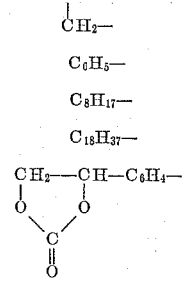

$$OH-CH_2-$$

$$HOOC-R_2-$$

where $R_2$ is selected from the class consisting of

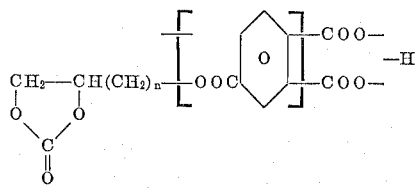

and aromatic nucleus; provided, when $R_2$ is substituted, said aromatic substituents are selected from at least one member of the group consisting of alkyl, aryl, aralkyl; alkaryl; alkoxy; aryloxy, carbolkoxy, acetoxy, halogeno, nitro, oxy, amino, imino, sulfo, sulfoxy, and mercapto; $n$ in the formulae is an integer from one to four; said polymer having admixed therewith an activator selected from the class consisting of the metals of Groups I, II and III of the Periodic Table, the inorganic, acidic salts of said metals, salts of weak inorganic acids, and salts of organic acids.

2. The process of claim 1 in which the carbonate is

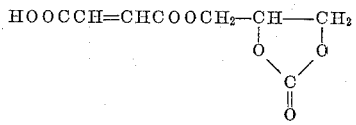

and the activator is $Na_2CO_3$.

3. The process of foaming synthetic thermoplastic polymers which comprises heating, at a temperature of at least 100° C., a polymer which is softened at such temperature, said polymer containing succinyl mono-glyceryl carbonate and having admixed therewith a sodium citrate.

4. The process of foaming synthetic thermoplastic polymers according to claim 1 comprising heating, at a temperature of at least 100° C., a polymer which is softened at such temperature, said polymer being the polymerization product of monomers containing at least one member of the group consisting of

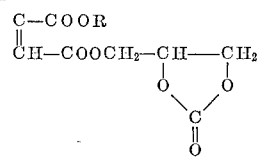

wherein R represents H, a lower alkyl group containing 1 to 5 carbon atoms and

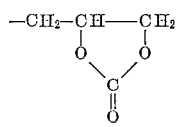

said polymer being admixed with an alkali metal salt.

References Cited by the Examiner

UNITED STATES PATENTS

| 2,628,945 | 2/1953 | Wayne | 260—2.5 |
| 2,967,173 | 1/1961 | Fang | 260—77.5 |
| 2,979,514 | 4/1961 | O'Brien et al. | 260—77.5 |

MURRAY TILLMAN, *Primary Examiner.*

LEON J. BERCOVITZ, SAMUEL H. BLECH, *Examiners.*

M. FOELAK, *Assistant Examiner.*